UNITED STATES PATENT OFFICE.

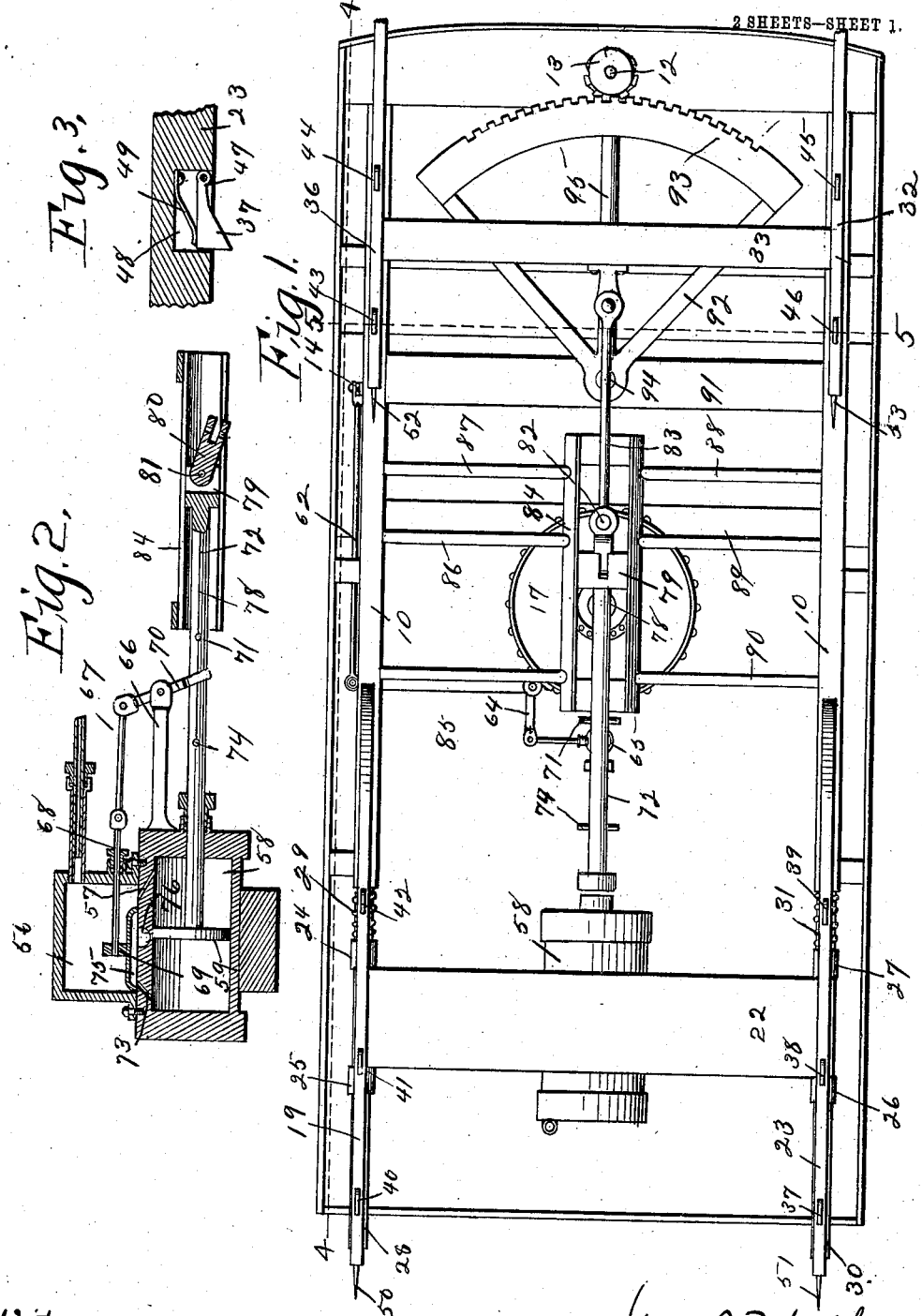

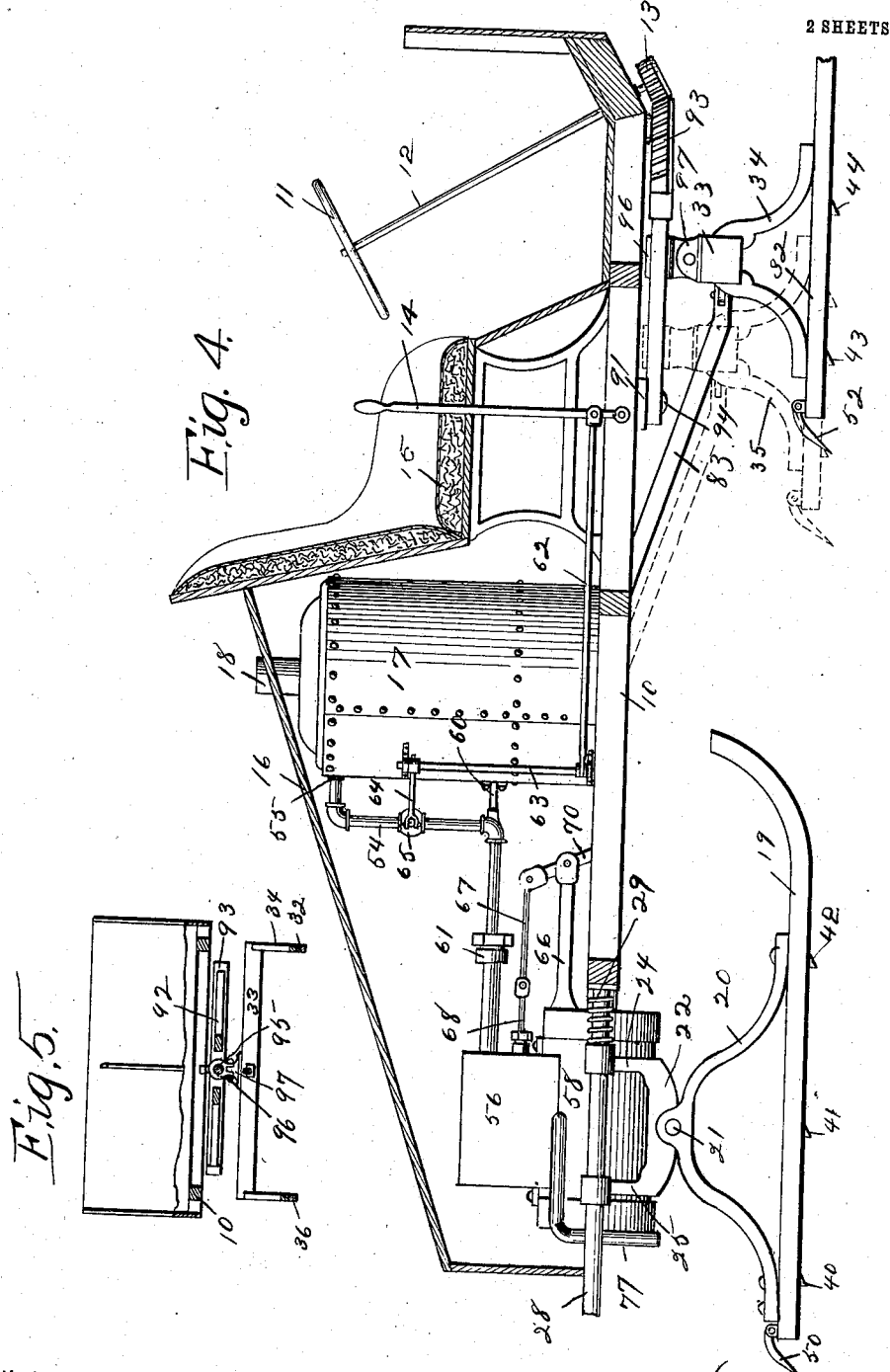

WILLIAM CARL MIELKE, OF PARKERS PRAIRIE, MINNESOTA.

AUTOMOBILE SLEIGH.

No. 867,285.      Specification of Letters Patent.      Patented Oct. 1, 1907.

Application filed April 16, 1906. Serial No. 312,065.

*To all whom it may concern:*

Be it known that I, WILLIAM CARL MIELKE, a citizen of the United States, residing at Parkers Prairie, in the county of Ottertail and State of Minnesota, have invented a certain new and useful Automobile Sleigh, of which the following is a specification.

The objects of my invention are to provide a self propelling sleigh or sled in which the motive power used is a motor or engine of suitable character, which can be easily and readily controlled from the driver's seat, and further to provide a mechanism by which this sleigh or sled is guided in operation.

A further object is to provide means for retaining the runners against rearward movement as the engine or motor operates the piston to force the body of the sleigh or sled forwardly.

A further object is to provide a device of this class of simple, durable and inexpensive construction, the parts of which can be easily adjusted and repaired whenever necessary.

My invention consists of certain details in the construction, arrangement and combination of the various parts of the device, whereby the objects contemplated are attained, as hereinafter set forth, pointed out in my claims and illustrated in the accompanying drawings, in which—

Figure 1 is an inverted plan view of my device. Fig. 2 is a sectional view of the cylinder, showing the piston therein and the valve chamber and valve. Fig. 3 is a detail sectional view of one of the runners, showing one of the teeth in elevation with the spring for maintaining this tooth normally at its outer limit of movement. Fig. 4 is a longitudinal, sectional view of the device taken on the line 4—4 of Fig. 1. Fig. 5 is a vertical, sectional view of the device taken on the line 5—5 of Fig. 1.

Referring to the accompanying drawings, I have used the numeral 10 to indicate the frame or body of my automobile sleigh or sled. Upon this frame 10 is mounted the steering wheel 11, which, by rod 12 passing through the bottom of frame 10, is rigidly attached to pinion 13. Throttle lever 14 and the driver's seat 15 are likewise secured to the frame 10 in the usual positions. The engine is inclosed by a cover or hood 16, of which the driver's seat 15 forms a part. Upon this frame 10 is mounted also a steam boiler 17, with its smokestack 18 projecting through the cover 16. Steam is the motive power of my sleigh as here set out; but any other suitable power may be applied.

Resting upon and rigidly attached at its lower ends to runner 19, is support 20. This support 20, at its upper end, is attached by pin 21 to bunk 22 in such a manner that the runner 19 may rock and thus the better conform to the inequalities of the surface over which it may be passing. Runner 23, in a similar manner, is connected to the opposite end of the bunk 22. The bunk 22 holds the runners 19 and 23 in position relative to each other and thus is formed the rear sled of my automobile sleigh.

At each end, the bunk 22 terminates in two vertically projecting arms 24 and 25 being at one end, and arms 26 and 27 at the other end. The upper end of each of the arms 24 and 25 has an opening in it through which the rounded rear portion of beam 28 of frame 10 extends in such a way as to allow these arms 24 and 25 to slide upon it. Around beam 28, immediately forward of arm 24 and back of the squared portion of the said beam 28, is coil spring 29, the purpose of which is to ease the jar incident to the operation of my automobile sleigh. Beam 30 of frame 10 is supported in a manner similar to beam 28. It plays through holes in the upper ends of arms 26 and 27, similar and corresponding to the holes in arms 24 and 25. Coil spring 31 encircles beam 30 in correspondence to the coil spring 29 upon beam 28. Thus is mounted the rear of the frame 10.

Runner 32 is rigidly attached to the bunk 33 by supports 34 and 35. The runner 36 is similarly attached to the opposite end of the bunk 33. The bunk 33 holds the runners 32 and 36 in position relative to each other and thus is formed the forward sled of my automobile sleigh.

Fitting, each into its chamber in the under surface of the runners 19, 23, 32 or 36, are the teeth 37, 38, 39, 40, 41, 42, 43, 44, 45 and 46. These teeth are of like construction, are similarly mounted, are operated by similar springs and are for the purpose of retaining the runners, and thus my automobile sleigh, against rearward movement, while permitting forward movement. Therefore I show but one tooth in detail in Fig. 3. This tooth 37 is pivotally attached, by its smaller end 47, to the runner 23, in the chamber 48, which chamber is of sufficient size and of such form as to wholly contain the tooth 37 upon occasion. The spring 49 is securely fastened to the ceiling of the chamber 48 in such a manner that its free end is in continuous contact with the tooth 37. This results in the tooth 37 swinging up into its chamber 48 as the runner 23 moves forwardly, but dropping and engaging the passing surface to retain the runner 23 against rearward movement.

The pawls 50, 51, 52 and 53 are pivotally attached to the upper surface, near the rear end, of the runners 19, 23, 32 and 36 respectively, and serve as aids to the aforementioned teeth in retaining the said runners against rearward movement.

From the boiler 17 the steam enters the pipe 54 at the point 55 and passes into the steam chest 56 and from thence, through steam port 57, into hollow cylinder 58 and forces the piston 59 toward the opposite end of the said cylinder 58. The pipe 54 is steadied by the brace 60. Expansion joint 61 provides for expansion or contraction in the pipe 54. Throttle lever 14, at its lower end, is pivotally fastened to the frame 10, and, by rods 62, 63 and 64, is so connected with the throttle valve 65 as to enable the driver of my automobile sleigh to fully control the flow of the steam through the pipe 54 and thus to regulate the movement of my sleigh.

Pivotally mounted upon the support 66, and connected by the rods 67 and 68 to slide valve 69, is rocker arm 70, which, as the piston reaches approximately the end of the cylinder 58 furthest from the steam port 57, engages lug 71 upon piston rod 72, and throws the slide valve 69 so as to close to the live steam the port 57 and open thereto the port 73, thus forcing the piston to the opposite end of the cylinder and completing its stroke. As the live steam from the chest 56 enters one steam port the other is serving as an exhaust port through which the dead steam is passing into the exhaust chamber 75 and from thence into the open air through exhaust opening 76 and the pipe 77. Lug 74 acts in a manner similar to but in reverse of lug 71.

Forming the forward end of the piston rod 78 is the crosshead 79, which, by coupling 80 and pin 81, is attached to the driving rod 83. The forward end of the driving rod 83 is pivotally attached to the central portion of the bunk 33 of the forward sled. Crosshead 79 runs in channel guide 84 and this guide is kept rigid relative to the frame 10 by the supports 85, 86, 87, 88, 89 and 90.

Pivotally attached to the cross-brace 91 of the frame 10 is a quadrant 92 by which the forward sled is directed to steer the vehicle. The forward edge of the quadrant has a series of teeth on it to form a rack 93, which is in mesh with the pinion 13, which pinion is controlled by the steering wheel 11 through the rod 12. By operating this steering wheel 11 the forward sled is turned to and maintained in the various positions necessary for guiding the vehicle. Connecting the rear portion of the rack 93 and that portion of the quadrant immediately in front of the point 94 is a shaft 95. Slidingly mounted on shaft 95 is a collar 96, to the lower portion of which the bunk 33 of the forward sled is pivotally attached by means of bracket 97, which is secured rigidly to the said bunk 33. By these means the forward sled is slidingly and pivotally mounted relative to the frame 10 of the sleigh and can be swung to the desired position to direct the movement of the sleigh. It will be seen by an examination of the drawings that, by reason of the fact that the forward sled is slidingly mounted and is connected with the rod 83 which is oscillated by the piston rod and its attachments, the forward sled will be moved forwardly by the forward stroke of the piston, and as this forward sled is retained against rearward movement by the projecting teeth on the runners, the return stroke of the piston will cause the frame 10 of the sleigh to be moved forwardly and the rear sled with it. The rear sled is retained against rearward movement, and with it the frame, while the forward sled is being moved forwardly by the forward stroke of the piston.

Having thus described my invention, what I claim and desire to secure by Letters Patent of the United States, therefore is—

1. In a device of the class described, a body, a rear sled secured to the said body, a forward sled formed of a frame slidingly mounted relative to the said body, and provided with runners means for forcing the forward sled forwardly, and the body and rear sled forwardly while the forward sled is retained at its forward limit of movement a steering segment secured to the forward sled, and means for operating said segment.

2. In a device of the class described, a body, a rear sled secured to said body, a forward sled formed of a frame slidingly mounted relative to said body and provided with runners means for forcing the forward sled forwardly and the body and rear sled forwardly while the forward sled is retained at its forward limit of movement, and steering means engaging the forward sled.

3. In a device of the class described, a body, a rear sled pivotally secured in position relative to the body, runners in said sled, dogs secured to said runners designed to enter snow or ice and prevent rearward movement of the sled, a forward sled formed of a frame provided with runners, teeth secured to said runners designed to prevent rearward movement of said sled, means for moving the forward sled forwardly to a position where it is retained by its teeth, and for drawing the body and rear sled forwardly, and steering means engaging the forward sled.

4. In a device of the class described, a body, a rear sled pivotally secured in position relative to the body, runners in said sled, dogs secured to said runners designed to enter snow or ice and prevent rearward movement of the sled, a forward sled formed of a frame provided with runners, teeth secured to said runners designed to prevent rearward movement of said sled, means for moving the forward sled forwardly to a position where it is retained by its teeth, for drawing the body and rear sled forwardly a steering segment carried by the forward sled, and means for operating said segment.

WILLIAM CARL MIELKE.

Witnesses:
ALBERT THUN,
ALLEN ERCKENBRAH.